UNITED STATES PATENT OFFICE.

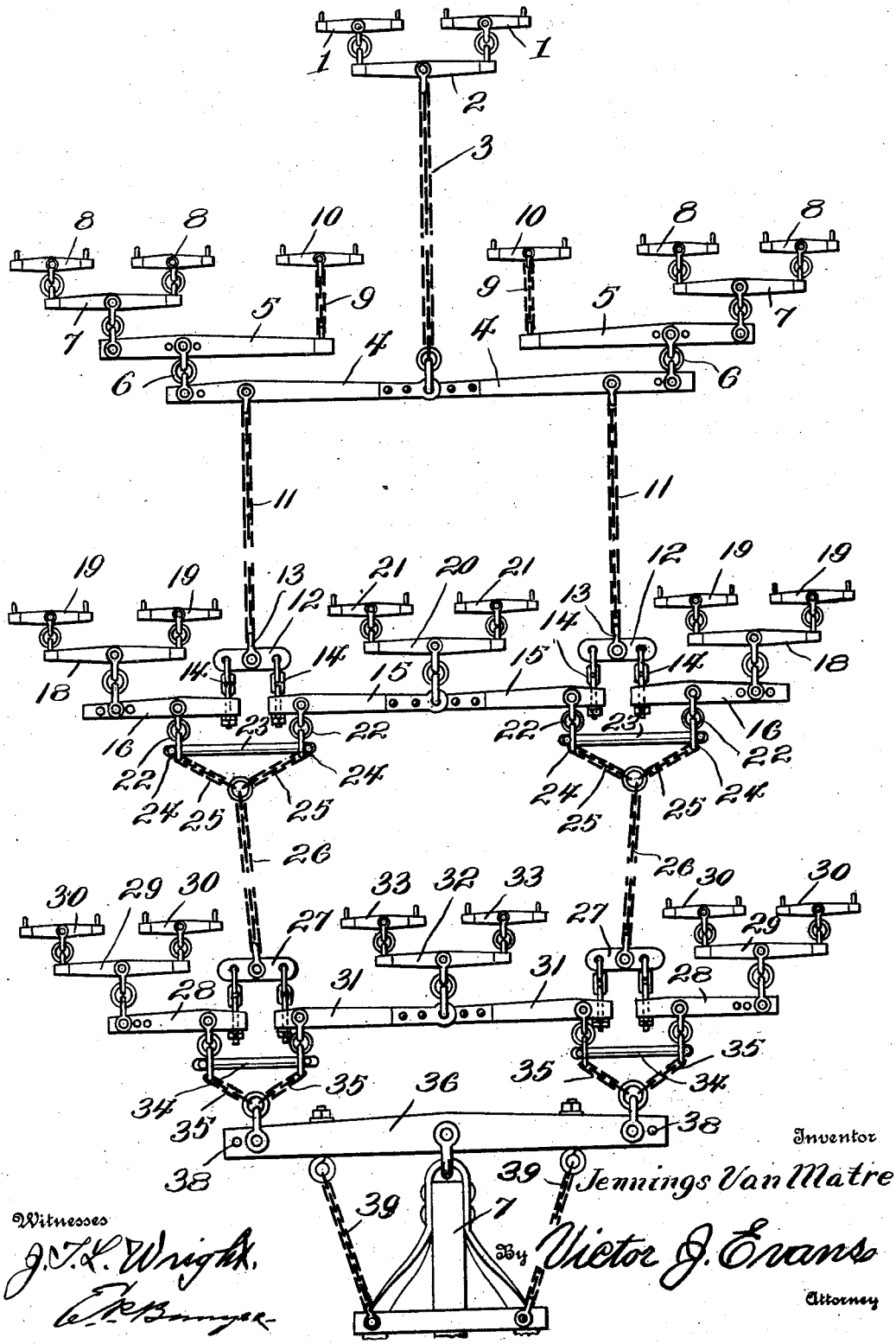

JENNINGS VAN MATRE, OF PASO ROBLES, CALIFORNIA.

DRAFT-EQUALIZER.

937,895.  Specification of Letters Patent.  Patented Oct. 26, 1909.

Application filed September 29, 1908. Serial No. 455,292.

*To all whom it may concern:*

Be it known that I, JENNINGS VAN MATRE, a citizen of the United States of America, residing at Paso Robles, in the county of San Luis Obispo and State of California, have invented new and useful Improvements in Draft-Equalizers, of which the following is a specification.

This invention relates to draft equalizers, and one of the principal objects of the same is to provide a two-chain equalizer which will hold a harvester to its work on a hillside and properly guide the machine during its work. The ordinary single-chain equalizers fail to keep the machine in proper line for its work, owing to the fact that there is a long line of draft, all from a single point, while in a two-chain equalizer the draft is applied upon opposite sides of the tongue from the leading animals back to the implement.

Another object of the two-chain equalizer is to provide means whereby the leading animals will guide the machine, and the animals back of the leaders will hold the machine to its work whether on a hillside or upon a plane surface.

These and other objects may be attained by means of the construction illustrated in the accompanying drawing in which the figure is a plan view illustrating the construction and arrangement of parts constituting my invention.

Referring to the drawing, the numerals 1 designate the whiffletrees for the leading animals, said whiffletrees being connected by links to the doubletree 2, and said doubletree being connected by a chain 3 to the evener bars 4. The front draft bars 5 are connected to the evener bars 4 by links 6, making a flexible connection between said two parts, and said connection being located at one side of the center of the draft bars 5. A doubletree 7 is connected to one end of each draft bar 5, and swingletrees 8 are connected to the doubletree 7. By means of a chain 9 a swingletree 10 is connected to the opposite end of each of the draft bars 5. The evener bars 4 are connected by means of chains 11 with links 12, said links being pivoted to a suitable clevis 13 connected to each of the chains 11. By means of chains or suitable links 14 the pivoted links 12 are connected to the evener bars 15 at their outer ends and to the inner ends of the bars 16. These bars 16 carry doubletrees 18 connected thereto by links or clevises, and said doubletrees each have attached thereto swingletrees 19. Connected to the inner ends of the bars 15 is a doubletree 20 to which is connected the swingletrees 21. The bars 15 and 16 are flexibly connected by means of suitable clevises or links 22 to spreader rods 23, said rods extending through links 24, and said links being connected to the branch chains 25. Connected to the branch chains 25 are the double chains 26, said chains 26 being pivoted to the links 27, said links being also connected to bars 28 similar to the bars 16, said bars carrying a doubletree 29 and swingletrees 30. Connected to the links 27 are evener bars 31 carrying a doubletree 32 to which is connected the swingletrees 33. Connected to the bars 28 and 31 by means of spreader rods 34 and branch chains 35 is the main draft bar 36 connected to the tongue 7 of the harvester or other implement. The branch chains 35 may be adjusted in the perforations 38. Stay chains 39 are connected to the draft bar 36 at one end and at their opposite ends are connected to the harvester or other implement.

From the foregoing it will be obvious that the implement is connected to the draft equalizer at opposite sides and that by this means I obviate a single long line of draft and am thus able to hold the implement upon the hillside and to properly guide the same.

I claim:—

The herein described draft equalizer comprising a pair of evener bars, draft bars pivotally connected at the outer ends of said evener bars, doubletrees connected to said draft bars at their outer ends, swingletrees connected to said doubletrees at their inner ends, chains connected to said evener bars and extending in parallel relation toward the vehicle or implement, a chain connected to the inner ends of said evener bars, a doubletree connected to said chain, swingletrees connected to said doubletree, links to which said parallel chains are connected, said links having chains connected thereto, evener bars connected to one of said chains, draft bars connected to the other chains, spreader rods connected to the last named eveners and draft bars, and branch chains connected to said spreader rods and extending to links connected to eveners and draft bars, the latter being attached to the vehicle or implement.

In testimony whereof I affix my signature in presence of two witnesses.

JENNINGS VAN MATRE.

Witnesses:
CRESTEN POULSEN,
JOHN T. SEPTORN.